United States Patent
Dez et al.

(10) Patent No.: US 12,168,720 B2
(45) Date of Patent: Dec. 17, 2024

(54) SYNTHESIS OF FUNCTIONALIZED POLYMERS THROUGH DEVULCANIZATION FROM WASTE CONTAINING ELASTOMERS

(71) Applicants: CENTRE NATIONAL DE LA RECHERCHE SCIENTIFIQUE, Paris (FR); UNIVERSITE DE CAEN NORMANDIE, Caen (FR); ECOLE NATIONALE SUPERIEURE D'INGENIEURS DE CAEN, Caen (FR)

(72) Inventors: Isabelle Dez, Caen (FR); Annie-Claude Gaumont, Caen (FR); Jean-Nicolas Noël, Pont-Saint-Martin (FR)

(73) Assignees: CENTRE NATIONAL DE LA RECHERCHE SCIENTIFIQUE, Paris (FR); UNIVERSITE DE CAEN NORMANDIE, Caen (FR); ECOLE NATIONALE SUPERIEURE D'INGENIEURS DE CAEN, Caen (FR)

(*) Notice: Subject to any disclaimer, the term of this patent is extended or adjusted under 35 U.S.C. 154(b) by 641 days.

(21) Appl. No.: 17/310,653

(22) PCT Filed: Feb. 18, 2020

(86) PCT No.: PCT/EP2020/054215
§ 371 (c)(1),
(2) Date: Aug. 16, 2021

(87) PCT Pub. No.: WO2020/169589
PCT Pub. Date: Aug. 27, 2020

(65) Prior Publication Data
US 2021/0388174 A1    Dec. 16, 2021

(30) Foreign Application Priority Data

Feb. 19, 2019  (FR) .................................. 1901667

(51) Int. Cl.
*C08J 11/26*      (2006.01)
*C08L 17/00*      (2006.01)

(52) U.S. Cl.
CPC ............ *C08J 11/26* (2013.01); *C08L 17/00* (2013.01); *C08J 2321/00* (2013.01); *C08L 2203/02* (2013.01); *C08L 2207/04* (2013.01)

(58) Field of Classification Search
USPC ........................................................ 521/43.5
See application file for complete search history.

(56) References Cited

U.S. PATENT DOCUMENTS

| | | | |
|---|---|---|---|
| 4,305,850 A | * | 12/1981 | Watabe .................... C08J 11/18 521/42.5 |
| 9,845,382 B2 | | 12/2017 | Pilard et al. |
| 2014/0128535 A1 | | 5/2014 | Rosenmayer et al. |
| 2015/0197581 A1 | | 7/2015 | Asadauskas et al. |
| 2016/0152805 A1 | | 6/2016 | Jasiunas et al. |

FOREIGN PATENT DOCUMENTS

| | | |
|---|---|---|
| CH | 232893 A | 6/1944 |
| RU | 2121484 C1 | 11/1998 |
| RU | 2219199 C2 | 12/2003 |
| RU | 2296780 C1 | 4/2007 |

OTHER PUBLICATIONS

International Search Report and Written Opinion received for PCT/EP2020/054215, mailed Apr. 20, 2020.
French Search Report received for Application No. 1901667, dated Dec. 13, 2019.
Rooj, S., et al., "New Route for Devulcanization of Natural Rubber and the Properties of Devulcanized Rubber," Journal of Polymers and the Environment, 2011, vol. 19, pp. 382-390.
Sabzekar M., et al., "Influence of process variables on chemical devulcanization of sulfur-cured natural rubber," Polymer Degradation and Stability, vol. 118, 2015, pp. 88-95.

* cited by examiner

*Primary Examiner* — Terressa Boykin
(74) *Attorney, Agent, or Firm* — Greer, Burns & Crain, Ltd

(57) ABSTRACT

A method for synthesising polymers through devulcanisation from waste containing elastomers, the method including:
a) contacting the waste containing elastomers with a solvent in the presence of a devulcanisation agent,
b) heating the mixture produced in step a), at a temperature of between 20° C. and 250° C. for a period of between 15 minutes and 24 hours in the presence of a devulcanisation agent, the concentration of devulcanisation agent, and the ratio between the concentration of devulcanisation agent, expressed as parts per hundred of elastomer (phr) and a volume of solvent, expressed in ml, is:
greater than 0.3 phr/ml of solvent or less than 0.2 phr/ml of solvent when the method is carried out in air,
greater than 0.06 phr/ml of solvent when the method is carried out in an inert atmosphere.

10 Claims, No Drawings

SYNTHESIS OF FUNCTIONALIZED POLYMERS THROUGH DEVULCANIZATION FROM WASTE CONTAINING ELASTOMERS

BACKGROUND

The present invention relates to the field of the treatment of waste containing elastomers, of natural and/or synthetic origin. In particular, the invention targets waste containing rubber, the major part of which is constituted by scrap tyres.

The present invention relates to the treatment of waste containing highly vulcanized elastomers, for example such as scrap lorry tyres.

Energy recovery from rubber waste is known in the prior art. Energy recovery consists of incinerating the rubber waste to produce energy. Energy recovery is extremely polluting.

Mechanical recovery of rubber waste is known in the prior art. This technique consists of grinding waste in order to produce granules, which can be used as additives at cement works or can be incorporated in certain materials.

Chemical recovery of rubber waste is also known in the prior art. Chemical recovery comprises pyrolysis and devulcanization. Pyrolysis consists of decomposing the rubber waste in the partial or complete presence of oxygen in order to obtain, among other things, a pyrolytic oil. Pyrolysis of rubber waste is a very expensive process.

Devulcanization consists of breaking the cross-links by causing rupture of the carbon-sulphur bonds and/or disulphide bridges so as to break the three-dimensional structure of vulcanized rubber either partially or completely. Mechanical devulcanization, microwave devulcanization and chemical devulcanization are known in the prior art.

Mechanical devulcanization is carried out by extrusion and causes non-selective rupture of the disulphide bridges, the carbon-carbon bonds of the polymer chain also being broken.

Microwave devulcanization aims to break the carbon-sulphur bonds or the disulphide bridges by emission of defined microwaves. However, and especially if carbon black is present in the composition of the rubber waste, as is the case with scrap tyres, this method causes a very pronounced temperature rise of the waste in a few seconds. This sudden temperature rise leads to rupture of the carbon-carbon bonds of the polymer chain.

Finally, chemical devulcanization of rubber waste is known, either by disulphide metathesis, or by rupture of the disulphide bridges by means of a devulcanizing agent.

The major disadvantage of metathesis is that it is a balanced reaction, precluding the attainment of a high degree of devulcanization.

Regarding devulcanization by rupture of the disulphide bridges by means of a devulcanizing agent, it has the advantage of low energy consumption. However, this method still presents limitations connected with the degrees of devulcanization obtained, which remain relatively low, and with its lack of selectivity. The main limitation of this technique lies in the extremely low degrees of devulcanization obtained when the rubbers to be devulcanized have high degrees of vulcanization.

Regarding chemical devulcanization, the documents Rooj S., Maji P. K., Basak G. C., Bhowmick A. K., Journal of Polymers and the Environment, 2011, Vol. 19, pp. 382-390 and Zohuri G., Asadi S., Kariminejad M., Mortazavi S. M., Chenar M. P., Sabzekar M., Polymer Degradation and Stability 2015, Vol. 118, pp. 88-95, are known in the prior art.

An aim of the invention is to overcome these drawbacks and in particular to propose a method for the synthesis of polymers by devulcanization of waste containing elastomers.

Another aim is to propose a method for the synthesis of polymers by devulcanization of waste containing elastomers displaying a high degree of devulcanization.

Another aim is to propose a method of selective synthesis of polymers by devulcanization of waste containing elastomers allowing the microstructure of the polymers obtained to be controlled.

Another aim is to propose a method for the synthesis of polymers by devulcanization of waste containing elastomers making it possible to obtain high degrees of devulcanization starting from highly vulcanized rubber waste.

Another aim is to propose a method for the synthesis of polymers by devulcanization of waste containing elastomers allowing functionalized polymers to be synthesized.

SUMMARY

For these purposes, according to a first aspect of the invention, a method for the synthesis of polymers by devulcanization from waste containing elastomers is proposed. The method according to the invention comprises:
  a) contacting said waste containing elastomers with a solvent in the presence of a devulcanizing agent,
  b) heating the mixture obtained in step a) at a temperature comprised between 20° C. and 250° C. for a time comprised between 15 minutes and 24 hours.

Thus according to the first aspect of the invention, the devulcanizing agent, designated DA, is a radical initiator. For example, the devulcanizing agent is a devulcanizing agent of cross-linking points comprising a sulphur atom bound to another sulphur atom or to a carbon atom.

The radical initiator is able to form one or more radicals. Preferably, the devulcanizing agent is able to form radicals by homolysis. More preferably, the devulcanizing agent is a peroxide.

According to the first aspect of the invention, either:
the radical initiator is a compound of formula (1)

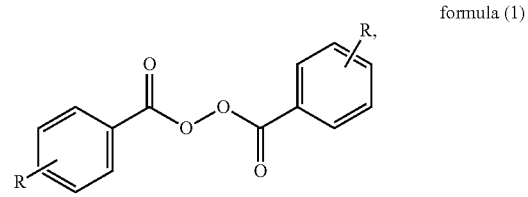

formula (1)

in which R and R' are identical or different and each represent, independently of one another, a substituent exerting a donor mesomeric effect or an attractor mesomeric effect or a donor inductive effect or an attractor inductive effect, or
  the concentration of devulcanizing agent is such that the ratio of said concentration of devulcanizing agent, expressed in parts per hundred of elastomer (phr), to a volume of solvent, expressed in ml, is:
    greater than 0.3 phr/ml of solvent or less than 0.2 phr/ml of solvent when the method is carried out under air,
    greater than 0.06 phr/ml of solvent when the method is carried out under an inert atmosphere.

According to the invention, R and R', which exert a donor mesomeric effect, an attractor mesomeric effect, a donor inductive effect or an attractor inductive effect, are selected independently of one another from the group comprising hydrogen (—H), the halogen atoms selected from iodine, bromine, fluorine and chlorine, the group of $(C_{1-18})$alkyls, the primary amines (—$NH_2$), secondary amines (—$NHRa_1$, $Ra_1$ being selected from $(C_1-C_5)$alkyl groups and aromatic rings) or tertiary amines (—$NRa_1Ra_2$, where $Ra_1$ and $Ra_2$, which may be identical or different, may each independently of one another be a $(C_1-C_5)$alkyl group or an aromatic ring), hydroxyl (—OH), the alcoholates (or a salt) ($Ra_1$—$O^-$, $Ra_1$ being selected from $(C_1-C_5)$alkyl groups and aromatic rings), the $(C_1-C_5)$alkoxy groups, a thiol (—SH), the thio-ethers (—$SRa_1$, $Ra_1$ being selected from $(C_1-C_5)$alkyl groups and aromatic rings), a thiolate (or a salt) ($Ra_1$—$S^-$), $Ra_1$ being selected from $(C_1-C_5)$alkyl groups and aromatic rings), an aromatic ring, a conjugated base of a carboxylic acid (—COO—), a carboxyl group (—COOH), the esters (—$CO_2$ $Ra_1$, $Ra_1$ being selected from $(C_1-C_5)$alkyl groups and heterocycles), an aldehyde group (—CHO), a carbonyl (—COR), a nitro group (—$NO_2$), a nitrile group (—CN), a sulphonyl group (—$SO_2$—), a sulphonate group (salt or acid)(—$SO_3$), a sulphone (—$SO_2R$), a phosphate group —O—$PO(ORa_1)(ORa_2)$ where $Ra_1$ and $Ra_2$, which may be identical or different, may each independently of one another be a hydrogen or $(C_1-C_5)$alkyl group or an aromatic ring), a primary amide group (—$CONH_2$), secondary amide group (—$CONHRa_1$, $Ra_1$ being selected from $(C_1-C_5)$alkyl groups and aromatic rings) or tertiary amide group (—$CONRa_1Ra_2$, $Ra_1$ and $Ra_2$, which may be identical or different, may each independently of one another be a $(C_1-C_5)$alkyl group or an aromatic ring)).

The term $(C_1-C_{18})$alkyl denotes any linear or branched carbon chain having from 1 to 18 carbon atoms and includes all the alkyl groups having 1 to 18 carbon atoms for example such as the methyl, ethyl, n-propyl, isopropyl, n-butyl, isobutyl, tert-butyl, neopentyl, isopentyl, hexyl, heptyl, octyl, nonyl, decyl, undecyl, dodecyl, tridecyl, tetradecyl, pentadecyl, hexadecyl, heptadecyl and octadecyl groups. Preferably, the $(C_1-C_{18})$alkyl group comprises chains with 1 to 8 carbon atoms or a $(C_1-C_8)$alkyl group in particular the methyl, ethyl, n-propyl, isopropyl, n-butyl, isobutyl, tert-butyl, neopentyl, isopentyl, hexyl, heptyl, octyl groups, more preferably chains with 1 to 5 carbon atoms or $(C_1-C_5)$ alkyl for example such as the methyl, ethyl, n-propyl, isopropyl, n-butyl, isobutyl, tert-butyl, neopentyl, isopentyl groups and more preferably chains with 1 to 3 carbon atoms or $(C_1-C_3)$alkyl, in particular the methyl, ethyl, n-propyl and isopropyl groups.

The term $(C_1-C_5)$alkyl denotes any linear or branched carbon chain having from 1 to 5 carbon atoms and includes all the alkyl groups having 1, 2, 3, 4 or 5 carbon atoms, in particular the methyl, ethyl, n-propyl, isopropyl, n-butyl, isobutyl, tert-butyl, neopentyl and isopentyl groups. The term $(C_1-C_5)$alkoxy is an O—$(C_1-C_5)$alkyl group where the $(C_1-C_5)$alkyl group is as defined above. There may be mentioned as examples the methoxy, ethoxy, butoxy and pentoxy groups.

The term aromatic ring includes the aryl groups, in particular the phenyl, benzyl, naphthyl, biphenyl and tetra-hydronaphthyl groups as well as the heterocycles, i.e. rings which, besides the carbon atoms, also comprise heteroatoms such as nitrogen, oxygen and sulphur. Thus, as examples of heterocycles there may be mentioned benzimidazolyls, furyls, imidazolyls, piperazinyls, piperidinyls, pyranyls, pyrazinyls, pyroazolidinyls, pyrazolinyls, pyrazolyls, pyridazinyls, pyridooxazoles, pyridoimidazoles.

Preferably, R and R' each represent, independently of one another, a hydrogen atom, a fluorine atom, a methoxy group or an acetoxy group.

Even more preferably, R and R' are identical and each represent a fluorine atom, a methoxy group or an acetoxy group.

When the radical initiator is a compound of formula (1), the polymers obtained by carrying out the method are functionalized polymers.

In an advantageous embodiment of the first aspect of the invention:
the radical initiator is a compound of formula (1), and
the concentration of devulcanizing agent is such that the ratio of said concentration of devulcanizing agent, expressed in parts per hundred of elastomer (phr), to the volume of solvent, expressed in ml, is:
greater than 0.3 phr/ml of solvent or less than 0.2 phr/ml of solvent when the method is carried out under air,
greater than 0.06 phr/ml of solvent when the method is carried out under an inert atmosphere.

Advantageously, R, R' or both are different from a hydrogen atom. In other words, either R and R' are different from a hydrogen atom, or R is different from a hydrogen atom, or R' is different from a hydrogen atom. In other words, R and R' are not simultaneously a hydrogen atom.

The method according to the invention makes it possible to obtain polymers. Preferably, the method according to the invention makes it possible to obtain polymers, in particular elastomers.

According to the invention, the polymers obtained are functionalized polymers of formula 2 and/or 2'

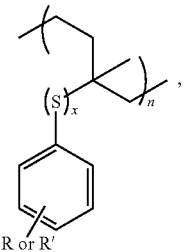

formula 2

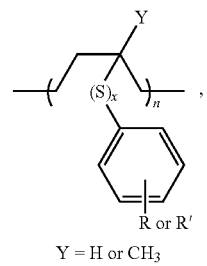

formula 2'

Y = H or $CH_3$ in which
R and R' may be identical or different and are as defined above, and
x is an integer comprised between 0 and 6 and preferably equal to 0, 1, 2, 3, 4, 5 or 6, and
n is an integer comprised between 6 and 600. The number n represents the number of units, each comprising a functional group, that were inserted along the polymer chain during devulcanization.

Advantageously, R and R' are different from a hydrogen atom.

Unlike the methods of the prior art, in which the functional group or groups is(are) only inserted at the end of the polymer chain, the functional group or groups is(are) inserted within the polymer chain. Thus, the method according to the invention makes it possible to insert the functional group or groups within the polymer chain, and thus obtain functionalized polymers of formula 2 and/or 2'.

The method according to the invention is based on the synthesis of polymers by devulcanization of the cross-linking points present in the waste starting from which the method is carried out. A cross-linking point comprises at least one sulphur atom bound to another sulphur atom or to a carbon atom. Such cross-linking points are present, in particular, in elastomers. Thus, according to the invention, by waste containing elastomers is meant waste containing sufficient elastomers so that after the method is carried out, the quantity of polymers synthesized is sufficient to be recoverable. A person skilled in the art will be able, based on their general knowledge, to define, from the content of elastomers in the waste to be treated, whether synthesis of polymers by carrying out the method according to the invention will be relevant.

According to the invention, a waste comprising at least 10 wt %, preferably at least 30 wt %, of elastomers relative to the total weight of waste has a concentration sufficient for the synthesis of polymer by devulcanization according to the invention to be carried out starting from said waste.

According to the invention, the waste containing elastomers may comprise:
- polyisoprene and/or polybutadiene, and/or
- butadiene-acrylonitrile (Nitrile Butadiene Rubber or NBR), and/or
- styrene-butadiene (Styrene-Butadiene Rubber SBR), and/or
- ethylene-propylene diene monomers (Ethylene Propylene Diene Monomer or EPDM), and/or
- may be waste of natural rubber (NR), and/or butyl rubber.

Preferably, the waste containing elastomers may be scrap lorry tyres, called highly vulcanized elastomer waste. By "Highly vulcanized" is meant elastomers having a cross-link density greater than 10-4 mol/ml, preferably greater than 10-3 mol/ml.

As a non-limitative example, if the waste is scrap tyres, it contains, once the metal parts have been removed, essentially elastomer, called rubber, and carbon black, called filler.

According to a particular embodiment of the invention, the scrap tyres used are pre-shredded tyres, shreds, crumb rubber or granules, preferably crumb rubber or granules.

Preferably, when the method is carried out under air, the concentration of devulcanizing agent is:
  comprised between 0.3 phr/ml of solvent and the concentration value, in phr/ml of solvent, for which the limit of solubility of the DA in the solvent is reached, or
  less than 0.2 phr/ml of solvent.

A person skilled in the art, applying their general knowledge and the teaching of the present document, will be able to determine the maximum concentration of DA that it is possible or that it will be appropriate to use. Similarly, when the concentration of DA is less than 0.2 phr/ml of solvent, a person skilled in the art, applying their general knowledge and the teaching of the present document, will be able to determine the minimum concentration of DA that it is possible or that it will be appropriate to use.

More preferably, when the method is carried out under air, the concentration of DA is:
  comprised between 0.3 phr/ml and 8 phr/ml of solvent, or
  less than 0.2 phr/ml of solvent.

More preferably, when the method is carried out under air, the concentration of DA is:
  comprised between 0.3 phr/ml and 0.6 phr/ml of solvent, or
  less than 0.2 phr/ml of solvent.

Preferably, when the method is carried out under argon, the concentration of DA is comprised between 0.06 phr/ml of solvent and the value of its concentration, in phr/ml of solvent, for which the limit of solubility of the DA in the solvent is reached.

More preferably, when the method is carried out under an inert atmosphere, the concentration of DA is comprised between 0.06 phr/ml and 8 phr/ml of solvent.

More preferably, when the method is carried out under an inert atmosphere, the concentration of DA is comprised between 0.06 phr/ml and 0.6 phr/ml of solvent.

According to the invention, by "inert atmosphere" is meant an atmosphere that does not react under the conditions in which the method is carried out. There may be mentioned, as a non-limitative example, an atmosphere consisting predominantly of nitrogen and/or noble gas, for example such as argon. Preferably, the atmosphere is constituted by nitrogen and/or noble gas.

Preferably, step b of the method is carried out at a temperature of the mixture comprised between 20° C. and 150° C., more preferably comprised between 40° C. and 120° C., even more preferably comprised between 60° C. and 100° C. Most preferably, the method is carried out at a temperature of 80° C.

Preferably, the heating time is comprised between 1 h and 8 h, more preferably comprised between 1 and 6 h.

Preferably, R and R' are selected from the groups comprising one or more carbon atoms and/or oxygen atoms and/or nitrogen atoms and/or phosphorus atoms and/or sulphur atoms and/or halogen atoms.

The polymers synthesized by the method according to the invention can be constituted by a mixture comprising polymers and oligomers. Preferably, the polymers synthesized are oligomers. According to the invention, the oligomers are considered to be a chain of monomers having a molecular weight of less than 2000 g/mol.

According to the invention, the solvent may be an organic solvent or an ionic liquid or a deep eutectic solvent or a mixture thereof. As an example, the ionic liquid may be selected from phosphoniums, imadazoliums or pyridiniums. The ionic liquids according to the invention are constituted by an anion and a cation and may be of the following general formula:

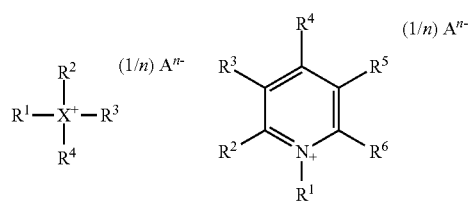

-continued

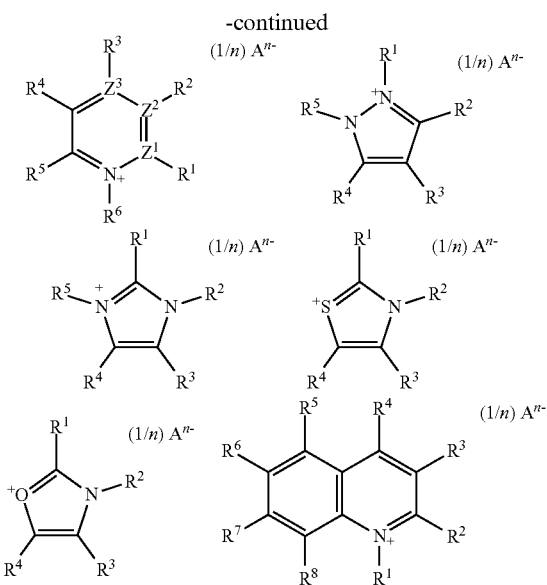

in which
A$^{n-}$ is an anion selected from the group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)N$^-$, CH$_3$SO$_3^-$, (C$_{12}$H$_{25}$)C$_6$H$_4$SO$_3^-$, R$^9$CO$_2^-$; R$^9$ being selected from the group comprising substituted or unsubstituted alkyl, substituted or unsubstituted aryl, and alkoxy; with n being equal to 1, 2 or 3 depending on the negative charge of the aforementioned anion and (1/n) being equal to 1 if the anion has one negative charge, ½ if the anion has two negative charges and ⅓ if the anion has three negative charges, X is a nitrogen, phosphorus or sulphur atom with the proviso that when X is a sulphur atom, at least one of the groups R$^1$, R$^2$, R$^3$, R$^4$ is zero, R$^1$, R$^2$, R$^3$, R$^4$, R$^5$, R$^6$, R$^7$ and R$^8$ may be identical or different, each being selected from a group comprising hydrogen, halogen, alkoxy, substituted or unsubstituted alkyl, substituted or unsubstituted aryl, and R$^1$-R$^2$, R$^2$-R$^3$, R$^3$-R$^4$, R$^4$-R$^5$, R$^5$-R$^6$, R$^6$-R$^7$, R$^7$-R$^8$ or R$^8$-R$^1$ may represent a ring with 5, 6 or 7 carbon atoms, Z$^1$, Z$^2$, Z$^3$ may be identical or different and are selected from a group comprising a carbon atom and a nitrogen atom, provided that at least one of the atoms Z$^1$, Z$^2$ and Z$^3$ represents a nitrogen atom and when one of the atoms Z$^1$, Z$^2$ and Z$^3$ is a nitrogen atom, the corresponding group R$^1$, R$^2$, R$^3$ is zero.

These ionic liquids are described on pages 9 to 15 of patent application FR 3014104.

The deep eutectic solvents according to the invention may be selected from:
mixtures of quaternary ammonium salt and metal chloride; as a non-limitative example, such a mixture may be a mixture of 1-ethyl-3-methylimidazolium and aluminium chloride (AlCl$_3$),
mixtures of quaternary ammonium salt and hydrated metal chloride,
mixtures of quaternary ammonium salt and hydrogen bond donor; as a non-limitative example the hydrogen bond donor may be urea or a urea derivative,
mixtures of hydrated metal chloride and hydrogen bond donor; as a non-limitative example the hydrogen bond donor may be urea or a urea derivative and as a non-limitative example said mixture may be a mixture of aluminium chloride (AlCl$_3$) and urea.

Preferably, the deep eutectic solvent may be a mixture of choline chloride and urea. More preferably, the deep eutectic solvent may be a mixture of choline chloride at 1 mol/l and urea at 2 mol/l.

The deep eutectic solvents may comprise, partly or completely, natural products among a mixture of aconitic acid and choline chloride, a mixture of malic acid and glucose, a mixture of malic acid and fructose, a mixture of malic acid and sucrose, a mixture of citric acid and sucrose, a mixture of maleic acid and sucrose, a mixture of glucose and fructose, a mixture of fructose and sucrose, a mixture of glucose and sucrose, a mixture of maleic acid and glucose, a mixture of citric acid and glucose.

The solvent may be a mixture of solvents. Preferably, the solvent may be a mixture of organic solvent and ionic liquid or a mixture of organic solvent and a deep eutectic.

The organic solvent is selected from the aromatic or aliphatic non-polar solvents. Preferably, the organic solvent is xylene.

The heating time of the mixture may be comprised between 1 and 12 hours when the method is carried out under an inert atmosphere.

Preferably, the heating time of the mixture may be comprised between 2 hours and 4 hours when the method is carried out under an inert atmosphere.

More preferably, the heating time of the mixture is 3 hours when the method is carried out under an inert atmosphere.

The heating time of the mixture may be comprised between 1 and 12 hours when the method is carried out under air.

Preferably, the heating time of the mixture may be comprised between 3 hours and 5 hours when the method is carried out under air.

More preferably, the heating time of the mixture is 4 hours when the method is carried out under air.

More preferably, when the method is carried out under air, the concentration of DA is less than 0.2 phr/ml of solvent.

The method may comprise, prior to step a), a step of activation of the waste containing elastomers, by lyophilization or by swelling or by treatment with supercritical CO$_2$. Swelling may be carried out in an organic solvent, an ionic liquid or a deep eutectic solvent. Lyophilization may be carried out in water directly, the water then being removed by sublimation. Lyophilization may be carried out in a solvent different from water; in this case a step of solvent exchange from the solvent, which is different from water, is carried out prior to the sublimation step. For treatment with supercritical CO$_2$, the waste is swollen in fluid CO$_2$ and then the CO$_2$ is removed by evaporation. A person skilled in the art, applying their general knowledge, is able to apply these various techniques of activation of the waste.

The step of activation by swelling may be carried out in a solvent identical to or different from that used when carrying out devulcanization.

Preferably, the step of activation by swelling may be carried out:
in an organic solvent with a dipole moment comprised between 0.5 and 2.5 debye, or
in an ionic liquid, a deep eutectic solvent or by treatment with supercritical carbon dioxide.

Preferably, the organic solvent with a dipole moment comprised between 0.5 and 2.5 debye is an aprotic solvent.

Preferably, the organic solvent with a dipole moment comprised between 0.5 and 2.5 debye is dichloromethane (DCM) or tetrahydrofuran (THF).

When the step of activation by swelling is carried out in an organic solvent with a dipole moment comprised between 0.5 and 2.5 debye, the swelling step is carried out away from the mixture, prior to devulcanization.

The method may also comprise, subsequently to step b), a step of separating the polymers obtained. This step may be carried out by any technique known to a person skilled in the art, for example by filtration, centrifugation, precipitation. The liquid phase, which contains the polymers, is recovered. In the case of scrap tyres, the solid phase, which contains carbon black, may be reused in a new formulation.

When the polymers synthesized by the method of devulcanization according to the invention comprise a mixture comprising polymers and oligomers, the separating step may comprise a step:

of recovery of the oligomers dissolved in a solvent, for example a polar solvent, in which the polymers are insoluble, and/or of metathesis causing rupture of the carbon-carbon double bonds of the polymers that are insoluble in the solvent used for solubilizing the oligomers so as to form oligomers that are soluble in said solvent.

The devulcanization reaction and the step of activation of the rubber waste may be carried out continuously.

Preferably, when the devulcanization reaction and the step of activation of the waste containing elastomers are carried out continuously, they are carried out concomitantly.

Preferably, when the devulcanization reaction and the step of activation of the waste containing elastomers are carried out continuously, they are carried out in the mixture.

Preferably, when the devulcanization reaction and the step of activation of the waste containing elastomers are carried out continuously, the solvent of the mixture is an ionic liquid or a deep eutectic.

When the devulcanization reaction and the step of activation of the waste containing elastomers are carried out continuously in an ionic liquid or a deep eutectic, the polymers obtained precipitate directly in the mixture.

According to the invention, the method according to the first aspect of the invention is a recycling process allowing waste comprising elastomers to be utilized.

According to a second aspect of the invention, a functionalized elastomer according to formula 3 and/or 3' is proposed,

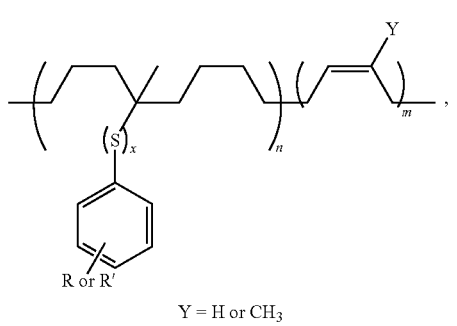

formula 3

Y = H or CH$_3$

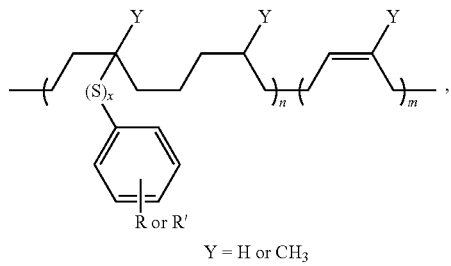

formula 3'

Y = H or CH$_3$ in which x is an integer comprised between 0 and 6, preferably equal to 0, 1, 2, 3, 4, 5, or 6, n represents the number of units, each comprising a functional group that was inserted along the polymer chain during devulcanization, and is an integer comprised between 6 and 600, m represents the number of monomers that the polymer comprises and is an integer comprised between 6 and 600, Y is a hydrogen atom or a methyl group, and R and R', identical or different for each unit, are selected from the group comprising hydrogen (—H), halogen atoms selected from iodine, bromine, fluorine and chlorine, the group of ($C_{1-18}$)alkyls, primary amines (—NH$_2$), secondary amines (—NHRa$_1$, Ra$_1$ being selected from ($C_1$-$C_5$)alkyl groups and aromatic rings) or tertiary amines (—NRa$_1$Ra$_2$, where Ra$_1$ and Ra$_2$, which may be identical or different, may each independently of one another be a ($C_1$-$C_5$)alkyl group or an aromatic ring), hydroxyl (—OH), alcoholates (or a salt) (Ra$_1$—O—, Ra$_1$ being selected from ($C_1$-$C_5$)alkyl groups and aromatic rings), ($C_1$-$C_5$)alkoxy groups, a thiol (—SH), thioethers (—SRa$_1$, Ra$_1$ being selected from ($C_1$-$C_5$)alkyl groups and aromatic rings), a thiolate (or a salt) (Ra$_1$—S$^-$, Ra$_1$ being selected from ($C_1$-$C_5$)alkyl groups and aromatic rings), an aromatic ring, a conjugated base of a carboxylic acid (—COO$^-$), a carboxyl group (—COOH), esters (—CO$_2$ Ra$_1$, Ra$_1$ being selected from ($C_1$-$C_5$)alkyl groups and heterocycles), an aldehyde group (—CHO), a carbonyl (—COR), a nitro group (—NO$_2$), a nitrile group (—CN), a sulphonyl group (—SO$_2$—), a sulphonate group (salt or acid)(—SO$_3$), a sulphone (—SO$_2$R), a phosphate group —O—PO(ORa$_1$)(ORa$_2$) where Ra$_1$ and Ra$_2$, which may be identical or different, may each independently of one another be a hydrogen or ($C_1$-$C_5$)alkyl group or an aromatic ring), a primary amide group (—CONH$_2$), secondary amide group (—CONHRa$_1$, Ra$_1$ being selected from ($C_1$-$C_5$)alkyl groups and aromatic rings) or tertiary amide group (—CONRa$_1$Ra$_2$, Ra$_1$ and Ra$_2$, which may be identical or different, may each independently of one another be a ($C_1$-$C_5$)alkyl group or an aromatic ring).

The term ($C_1$-$C_{18}$)alkyl denotes any linear or branched carbon chain having from 1 to 18 carbon atoms and includes all alkyl groups having 1 to 18 carbon atoms for example such as methyl, ethyl, n-propyl, isopropyl, n-butyl, isobutyl, tert-butyl, neopentyl, isopentyl, hexyl, heptyl, octyl, nonyl, decyl, undecyl, dodecyl, tridecyl, tetradecyl, pentadecyl, hexadecyl, heptadecyl and octadecyl groups. Preferably, the ($C_1$-$C_{18}$)alkyl group comprises chains with 1 to 8 carbon atoms or a ($C_1$-$C_{18}$)alkyl group, in particular the methyl, ethyl, n-propyl, isopropyl, n-butyl, isobutyl, tert-butyl, neopentyl, isopentyl, hexyl, heptyl, octyl groups, more preferably chains with 1 to 5 carbon atoms or ($C_1$-$C_5$)alkyl for example such as the methyl, ethyl, n-propyl, isopropyl, n-butyl, isobutyl, tert-butyl, neopentyl, isopentyl groups and more preferably chains with 1 to 3 carbon atoms or ($C_1$-$C_3$) alkyl, in particular the methyl, ethyl, n-propyl and isopropyl groups.

The term ($C_1$-$C_5$)alkyl denotes any linear or branched carbon chain having from 1 to 5 carbon atoms and includes all the alkyl groups having 1, 2, 3, 4 or 5 carbon atoms, in particular the methyl, ethyl, n-propyl, isopropyl, n-butyl, isobutyl, tert-butyl, neopentyl and isopentyl groups.

The term ($C_1$-$C_5$)alkoxy is an O—($C_1$-$C_5$)alkyl group where the ($C_1$-$C_5$)alkyl group is as defined above. There may be mentioned as examples the methoxy, ethoxy, butoxy and pentoxy groups.

Preferably, R or R' represents each independently of one another a hydrogen atom, a fluorine atom, a methoxy group or an acetoxy group.

According to the invention, R and R' may be different from a hydrogen atom.

Even more preferably, R and R' represent a fluorine atom, a methoxy group or an acetoxy group.

As described above, unlike the methods of the prior art in which the functional group or groups are only inserted at the end of the polymer chain, the functional group or groups are inserted within the polymer chain. Thus, the method according to the invention makes it possible to insert the functional group or groups within the polymer chain, and thus obtain functionalized polymers of formula 3 and/or 3'.

Formula 4 illustrates the general chemical structure of an elastomer.

According to a third aspect of the invention, a use of functionalized elastomers according to the second aspect of the invention as materials is proposed.

Preferably, the use of functionalized elastomers according to the second aspect of the invention is proposed, as elastomeric materials, thermoplastic elastomers or elastomers for biomedical use.

According to a fourth aspect of the invention, polymer compositions obtainable by the method according to the first or second aspect of the invention are proposed. The method according to the invention makes it possible to obtain polymer compositions. Said polymer compositions can be constituted by oligomers or of a mixture comprising polymers and oligomers. The polymer composition is a function of the waste subjected to the method of devulcanization according to the invention. The polymer composition comprises elastomers when the waste comprises elastomers.

According to a fifth aspect of the invention, a use of the polymer compositions obtained according to the fourth aspect of the invention is proposed, as additives in mixtures of fresh or new elastomers, as additives or reagents such as surfactants, cross-linking agents or chain extenders.

A use of the polymer compositions obtained according to the fourth aspect of the invention is proposed as materials, in particular as thermoplastic elastomers or elastomers in the biomedical field.

DETAILED DESCRIPTION

According to the embodiments presented, the devulcanization process is carried out starting from granules or crumb rubbers of scrap lorry tyres. The balanced reaction of the process of chemical devulcanization by rupture of the disulphide bridges by means of a devulcanizing agent is presented in reaction schemes 1 and 1' given below.

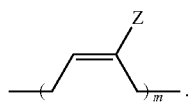

formula 4

Reaction scheme 1

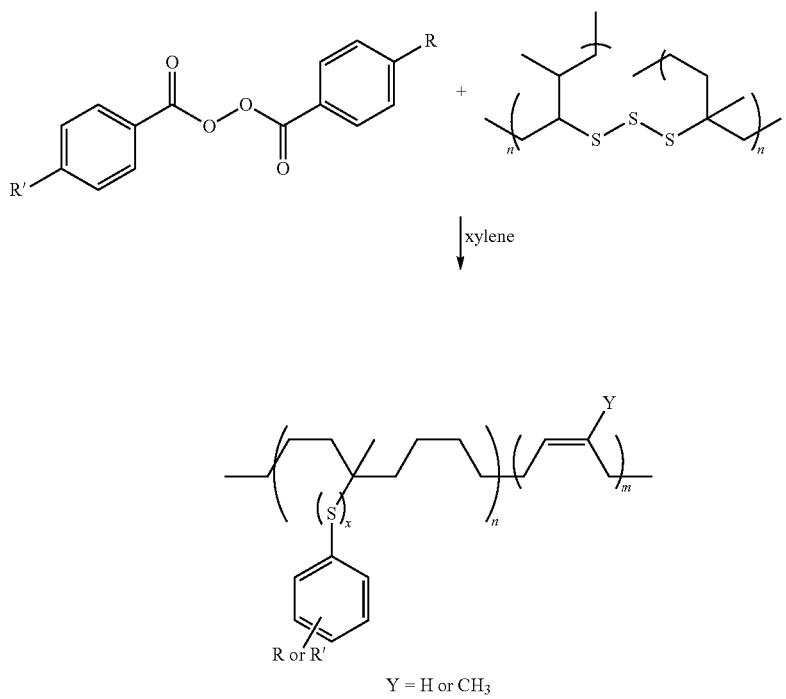

Y = H or $CH_3$

-continued
Reaction scheme 1'

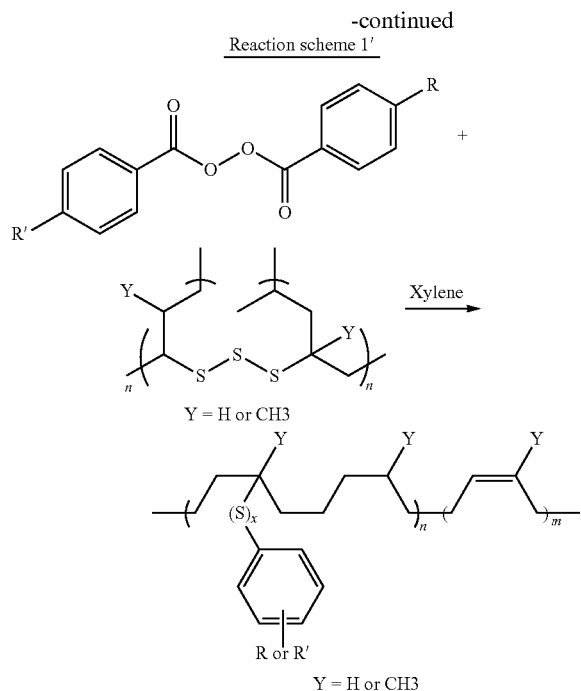

This devulcanization process therefore constitutes a route for synthesis of polymers starting from scrap tyres. The type of polymer synthesized, in terms of chain length, is mainly governed by the degree of polymerization of the elastomers contained in the waste starting from which the method is carried out. According to the embodiments described, the waste containing elastomers starting from which the method is carried out is derived from scrap lorry tyres. Depending on the parameters used for carrying out the method, synthesis leads to obtaining oligomers or a mixture comprising polymers and oligomers. The polymers obtained according to reaction scheme 1 comprise a number, designated n, of units, each comprising a functional group that was inserted along the polymer chain during devulcanization, which is comprised between 6 and 600, a number of sulphur atoms, designated x, joining the functional group to the polymer chain, which is comprised between 0 and 6, and a number, designated m, of monomers that the polymer comprises, which is comprised between 6 and 600.

Scrap lorry tyres are known to be highly vulcanized. The devulcanizing agent is introduced at a level of 6 wt % relative to the rubber waste. A person skilled in the art denotes this ratio as "phr", it being 6 parts of DA per 100 parts of rubber waste by weight, "phr" standing for "per hundred rubber". The weight of initial waste, when carrying out each of the embodiments presented, is 300 mg.

According to the invention, on completion of the synthesis process, an additional step for the purpose of recovering the synthesized polymers is carried out: it consists of Soxhlet treatment of the devulcanized waste with acetone for 24 h to recover the functionalized polymers. When the polymers synthesized are in suspension and/or solvated, a person skilled in the art will be able to select the chemical process for separation or extraction that is the most suitable for recovering them.

The degree of devulcanization, designated DDV hereinafter in the description, obtained after carrying out the method, is determined by the Flory principle through variation of the cross-link density by the method described by Paul J. Flory and John Rehner, The Journal of Chemical Physics, 1943, Vol. 11, p. 521. It therefore allows specific measurement of the ruptures of the disulphide bridges and carbon-sulphur bonds. The value of the DDV will therefore make it possible to evaluate specifically the efficiency of the devulcanization reaction. In the documents of the state of the art, DDV is generally determined from sol-gel measurements, generally by means of a Soxhlet extraction process, and in particular starting from the soluble fraction of the devulcanized polymer. The soluble fraction determined comprises the ruptures of the disulphide bridges and of the carbon-sulphur bonds but also the ruptures of the carbon-carbon bonds of the polymer chain.

Based on the understanding that rubber is mainly constituted by polyisoprene and that the carbon-carbon double bonds are also sensitive to free radicals, the inventors deduced that the main source of depolymerization is that which is generated by the reaction of the DA on the carbon-carbon double bonds of polyisoprene. Thus, for accurate evaluation of the selectivity of the method according to the invention, the degree of functionalization, designated DOF hereinafter in the description, of the polyisoprene contained in scrap tyres was studied in parallel under conditions identical to those used when carrying out the method. The polyisoprene selected for determining the DOF has a degree of polymerization equivalent to that of the scrap lorry tyres used. The value of the DOF will therefore allow accurate evaluation of the specificity of the devulcanization reaction with respect to disulphide bridges and carbon-sulphur bonds. A process giving a DOF less than 30% will be regarded as having acceptable selectivity. The balance reaction of depolymerization of polyisoprene by reaction of the devulcanizing agent on the carbon-carbon double bonds of polyisoprene or polybutadiene is presented by the following reaction scheme 2.

Reaction scheme 2

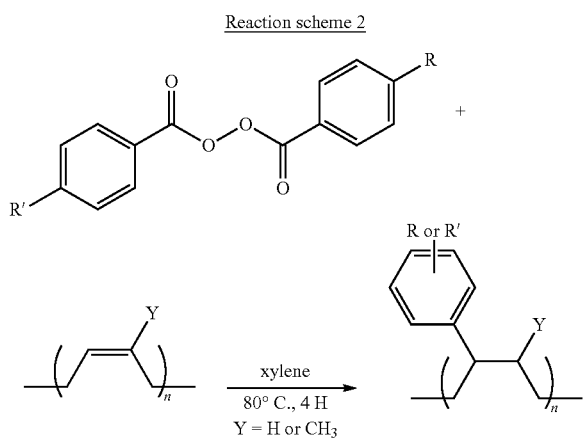

The balance reaction of depolymerization of polyisoprene by reaction of the devulcanizing agent on the carbon-carbon double bonds of polyisoprene or polybutadiene may be supplemented with the following reaction scheme 3.

Reaction scheme 3

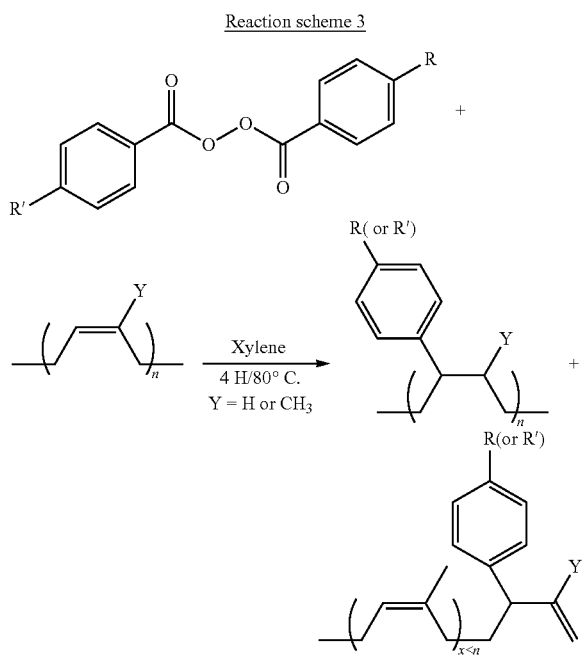

According to a first embodiment, the method for synthesizing oligomers by devulcanization is carried out under air and the DA is benzoyl peroxide of formula 1a, which corresponds to the compound of formula 1 in which R and R' are hydrogen atoms, formula 1a

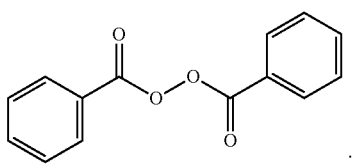

The solvent used is xylene.

Table 1 shows the effect of the temperature on the method according to the first embodiment. It will be noted that moving from a temperature of 80° C. to a temperature of 100° C. causes the DDV to be multiplied by a factor of two but the DOF to be multiplied by a factor of twelve. This demonstrates that the depolymerization reaction is significant beyond 80° C.

TABLE 1

| Volume of xylene (ml) | Time (hours) | Temperature (° C.) | DDV | DOF |
| --- | --- | --- | --- | --- |
| 25 | 4 | 80 | 31.5% | 7% |
| 25 | 4 | 100 | 69.3% | 83% |

Table 2 shows the effect of time on the method according to the first embodiment. Table 2 shows that the DDV increases, reaching a maximum at a reaction time of 4 hours, and then slowly decreases. For its part, the DOF is relatively stable and low. It changes from 5% for reaction times of two and three hours to 7% for reaction times of four and five hours.

TABLE 2

| Volume of xylene (ml) | Time (hours) | Temperature (° C.) | DDV | DOF |
| --- | --- | --- | --- | --- |
| 25 | 2 | 80 | 17.4% | 5% |
| 25 | 3 | 80 | 26% | 5% |
| 25 | 4 | 80 | 31.5% | 7% |
| 25 | 5 | 80 | 30.5% | 7% |

Table 3 shows the effect of the concentration of DA on the method according to the first embodiment. For a concentration of 0.24 phr per millilitre of solvent, i.e. a quantity of 6 wt % of DA in a volume of solvent of ml, the DDV is relatively low and the DOF is 5%. For a concentration of DA of 0.6 phr/ml of solvent, i.e. a quantity of 6 wt % of DA in a volume of solvent of 10 ml, regarded as a high concentration, the DDV is 61.3% and the DOF is 82%. For a concentration of DA of 0.06 phr/ml of solvent, i.e. a quantity of 6 wt % of DA in a volume of solvent of 100 ml, regarded as a low concentration, the DDV is 61.2% and the DOF is 18%. Surprisingly, for one and the same time for which the method is carried out, the DDV obtained for a high concentration of DA is similar to that obtained for a low concentration of DA. The high value of the DOF observed when carrying out the method with a high concentration of DA confirms the presence of a secondary depolymerization reaction. It should be noted that even if selectivity is low when using a high concentration of DA, the DDV obtained for highly vulcanized waste such as scrap lorry tyres, having a cross-link density of $13.5 \times 10^4$ mol/ml, is at least equal to, or even greater than, that obtained for rubbers having much lower cross-link densities, typically $2.6 \times 10^4$ mol/ml. It can be seen that for low concentrations of DA, the method makes it possible to obtain good DDV values and has very good selectivity, 18% of DOF.

TABLE 3

| Volume of xylene (ml) | Time (hours) | Temperature (° C.) | DDV | DOF |
|---|---|---|---|---|
| 25 | 4 | 80 | 31.5% | 5% |
| 10 | 4 | 80 | 61.3% | 82% |
| 100 | 4 | 80 | 61.2% | 18% |

According to a second embodiment, the method is carried out under an inert atmosphere, under argon, the DA is benzoyl peroxide of formula 1a and the solvent used is xylene

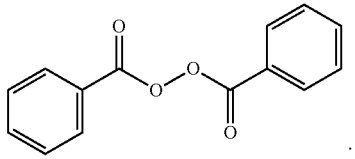

formula 1a

Table 4 shows the effect of the inert atmosphere on the DDV according to the second embodiment. The DDV is multiplied by a factor of two compared to the method carried out under the same conditions under air. However, the DOF is also multiplied by a factor of two but still has a low value. Thus, when optimum selectivity is required, carrying out the method under air is to be preferred, whereas when an optimum efficiency of devulcanization is required, carrying out the method under argon is to be given preference.

TABLE 4

| Atmosphere | Volume of xylene (ml) | Time (hours) | Temperature (° C.) | DDV | DOF |
|---|---|---|---|---|---|
| Under air | 25 | 4 | 80 | 31.5% | 5% |
| Under argon | 25 | 4 | 80 | 67.3% | 14% |

Table 5 shows the effect of time on the method according to the second embodiment. Table 5 shows that the DDV increases, reaching a maximum at a reaction time of 3 hours, and then quickly decreases. For its part, the DOF increases with time. It changes from 100/for reaction times of two and three hours to 140/and then 160/for reaction times of four and five hours.

TABLE 5

| Volume of xylene (ml) | Time (hours) | Temperature (° C.) | DDV | DOF |
|---|---|---|---|---|
| 25 | 2 | 80 | 60% | 10% |
| 25 | 3 | 80 | 70% | 10% |
| 25 | 4 | 80 | 67.3% | 14% |
| 25 | 5 | 80 | 55% | 16% |

Table 6 shows the effect of the concentration of DA on the method according to the second embodiment. It can be seen that a decrease in the concentration of DA leads to a decrease in the DDV and an increase in the DOF. Thus, in contrast to carrying out the method under air, values of the concentration of DA greater than 0.06 phr/ml of solvent are to be preferred when the method is carried out under argon. This indicates that when the method is carried out under argon, in addition to the reactions of devulcanization and of radical depolymerization, an additional reaction appears. It may for example be cross-linking of sulphur-containing radicals on disulphide bridges and/or double bonds of the polymer chain.

It can also be seen that carrying out the method according to the second embodiment for values of concentration of DA greater than 0.06 phr/ml of solvent gives rise to values of DDV and of DOF that are equivalent to, or even slightly better than, those obtained when the method is carried out according to the first embodiment for values of concentration of DA less than 0.2 phr/ml of solvent.

TABLE 6

| Atmosphere | Volume of xylene (ml) | Time (hours) | Temperature (° C.) | DDV | DOF |
|---|---|---|---|---|---|
| Under argon | 25 | 4 | 80 | 67.3% | 14% |
| Under argon | 100 | 4 | 80 | 59.3% | 20% |
| Under air | 100 | 4 | 80 | 61.2% | 18% |

According to a particular embodiment of the method according to the invention, a step of activation of the granules of scrap tyres is carried out prior to the devulcanization reaction.

According to a first variant, activation comprises a step of swelling of the granules. Table 7 shows the effect of the type of solvent on the degree of swelling of the granules and on the proportion of the granules solubilized by the solvent. This swelling step consists of putting a given quantity of granules from scrap tyres in a solvent for a given time and recovering the proportion of the scrap tyres that has been solubilized by the solvent. The experiments were each carried out three times, and the calculated average is reported in Table 7. Table 7 shows that the polar solvents, acetone (dipole moment $\mu=2.86$ debye), are not effective, the solubilized proportion of the waste is very low and the degree of swelling is also very low. The non-polar solvents, pentane (dipole moment $\mu=0.2$ D), are not very effective. However, the solvents of low polarity, dichloromethane (DCM) (dipole moment $\mu=1.55$ D) and tetrahydrofuran (THF) (dipole moment $\mu=1.75$ D), show a very good efficiency of dissolution of the waste and swelling of the waste. This is in particular the case when the experiment is carried out using an extractor of the Soxhlet type. Generally, it is considered that a non-polar solvent has a polar moment less than 0.5 D and that a polar solvent has a dipole moment greater than 2D or even 2.5 D. Regarding the protic or aprotic aspect of the solvent, it would appear that the protic solvents have the lowest efficiency. In fact, when a comparison is made, ethanol ($\mu=1.74$ D), which has a dipole moment equal to that of THF and lower than that of acetone, produces the lowest degree of swelling and the lowest dissolution of the waste.

TABLE 7

| Solvent | Time | Conditions | Degree of swelling | Soluble fraction |
|---|---|---|---|---|
| DCM | 2.5 h | 20 ml | 128% | 6.4% |
| DCM | 2.5 h | Soxhlet | 131% | 8.4% |
| DCM | 24 h | 20 ml | 131% | 9.8% |
| THF | 24 h | 20 ml | 126% | 10.7% |
| Acetone | 2.5 h | 20 ml | 12% | 4.9% |
| Ethanol | 2.5 h | 20 ml | 5% | 2.3% |
| Pentane | 2.5 h | 20 ml | 49% | 7.7% |

According to a second variant, activation comprises a step of lyophilization of the granules. The granules are swollen in DCM for 24 h by the method described in the first variant. Then, a DCM-ethanol and then ethanol-water solvent exchange is carried out. The water-swollen granules are then frozen and lyophilized for 48 h.

Table 8 shows the effect of activation by lyophilization on the devulcanization of granules from scrap tyres.

When the method is carried out under air starting from lyophilized granules, the DDV is markedly greater than that obtained with granules that have not undergone activation. The DOF remains unchanged, and low.

When the method is carried out under argon starting from lyophilized granules, the DDV decreases significantly whereas the DOF remains constant. This indicates that the radical cross-linking that appears when the method is carried out under argon is exacerbated when the scrap tyres are lyophilized. Moreover, when the concentration of DA decreases, from 0.24 phr/ml of solvent to 0.06 phr/ml of solvent, the DDV decreases and the DOF increases. This again confirms the above results and those presented in Table 6, according to which radical cross-linking is amplified when the concentration of DA decreases.

TABLE 8

| Type of waste | Atmosphere | Volume of xylene (ml) | Time (hours) | Temperature (° C.) | DDV | DOF |
| --- | --- | --- | --- | --- | --- | --- |
| Granules | Under air | 25 | 4 | 80 | 31.5% | 7% |
| Lyophilized granules | Under air | 25 | 4 | 80 | 53.1% | 7% |
| Granules | Under argon | 25 | 4 | 80 | 67.3% | 14% |
| Lyophilized granules | Under argon | 25 | 4 | 80 | 55.8% | 14% |
| Lyophilized granules | Under argon | 100 | 4 | 80 | 48% | 20% |
| Granules | Under argon | 100 | 4 | 80 | 59.3% | 20% |

According to a third variant, activation comprises a step of swelling of the granules in an ionic liquid, trihexyltetradecylphosphonium chloride, known by the trade name "Cyphos 101" for 12 hours.

Table 9 shows the effect of carrying out the method under air starting from granules that have undergone a step of swelling in ionic liquid. Compared to the DDV and DOF obtained in the absence of activation, an increase of the DDV by a factor of two and a clear increase in the DOF is observed. Compared to the DDV and DOF obtained during activation by lyophilization, an appreciable increase in the DDV and a clear increase in the DOF is observed.

TABLE 9

| Type of waste | Volume of xylene (ml) | Time (hours) | Temperature (° C.) | DDV | DOF |
| --- | --- | --- | --- | --- | --- |
| Granules swollen in ionic liquid | 25 | 4 | 80 | 55.8% | 30% |
| Granules | 25 | 4 | 80 | 31.5% | 7% |
| Lyophilized granules | 25 | 4 | 80 | 53.1% | 7% |

According to a fourth variant, activation comprises a step of swelling of the granules by treatment with supercritical $CO_2$ ($ScCO_2$). The activation step consists of treating the granules by swelling in ethanol or acetone, and then carrying out a solvent exchange between ethanol, or acetone, and $ScCO_2$ in a dehydrator. The results of the synthesis of polymers by devulcanization carried out starting from granules swollen by treatment with $ScCO_2$ are presented in Table 10.

TABLE 10

| Type of waste | Volume of xylene (ml) | Time (hours) | Temperature (° C.) | DDV | DOF |
| --- | --- | --- | --- | --- | --- |
| Granules swollen by treatment with $ScCO_2$ | 25 | 4 | 80 | 27% | 7% |

According to another embodiment of the method according to the invention, the devulcanizing agent used corresponds to formula 1 in which R and R' are different from a hydrogen atom. These DAs are therefore derivatives of benzoyl peroxide (BPO). The use of said derivatives makes it possible to synthesize functionalized oligomers according to formula 3 and/or 3' by devulcanization of rubber waste. Besides the fact that the synthesized oligomers are derived from rubber waste, the fact that they are functionalized constitutes an additional advantage with a view to their subsequent use. In fact, as the functional group may comprise a wide choice of substituents R, R' such as proposed according to the invention, subsequent use is facilitated thereby and the technical fields of potential applications are broadened. Advantageously, the derivatives of PBO used are those corresponding to formula 1 in which R and R' are identical and are in the para position relative to the peroxide group. In a more preferred embodiment, the derivatives correspond to formulae 1b, 1c and 1d. The compound of formula 1b comprises two fluorine atoms as substituent R and R', which exert an effect of the attractor inductive type on the aromatic ring to which they are bound. The compound of formula 1c comprises two methoxy groups (—$OCH_3$) as substituent R and R', which exert an effect of the donor mesomeric type on the aromatic ring to which they are bound. The compound of formula 1d comprises acetoxy groups (—C(=O)$OCH_3$) as substituent R and R', which exert an effect of the attractor mesomeric type on the aromatic ring to which they are bound.

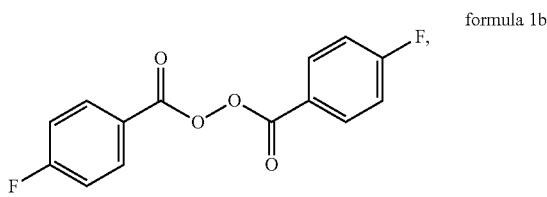

formula 1b

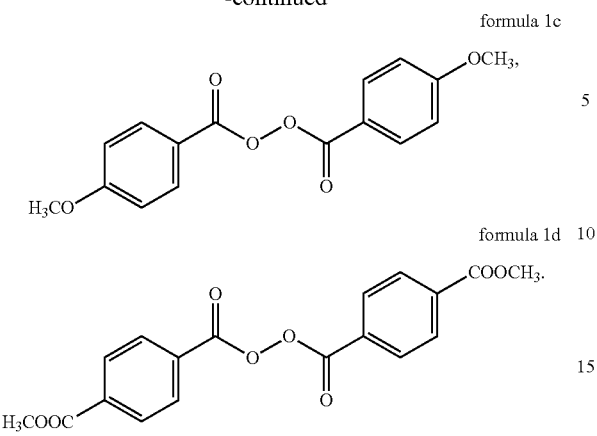

formula 1c formula 1d

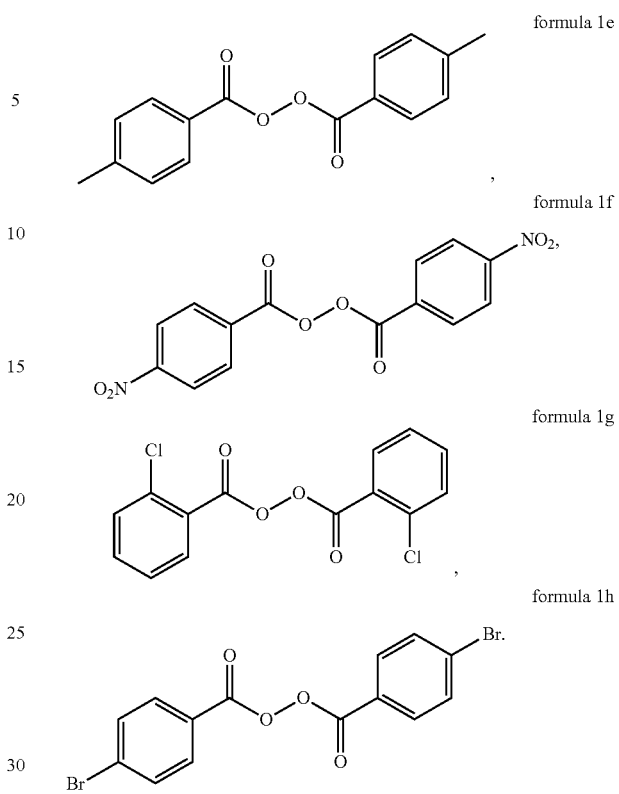

formula 1e formula 1f formula 1g formula 1h

The method was carried out under air starting from granules from scrap lorry tyres that had not undergone activation. The effect of the various substituents R and R' is shown in Table 11. Each of the derivatives of BPO (1b, 1c and 1d) gives rise to a clear improvement of the DDV. Compounds 1b and 1d give rise to an improvement of the DDV by a factor of two. Compounds 1b and 1c also produce a notable increase in the DOF, but it remains less than 30%. Compound 1d, however, produces a decrease in the DOF to 2% and consequently makes the method highly selective. Surprisingly, whether the electron density of the aromatic ring is increased by the effect of the substituents exerting a donor effect or whether its electron density is depleted by the effect of the substituents exerting an attractor effect, the DDV remains markedly increased with the substituted derivatives of BPO comprising donor or attractor substituents R and R'.

This therefore makes it possible to envisage the synthesis of a great variety of functionalized oligomers. The results obtained when compound 1d is used when carrying out the method are particularly interesting in terms of selectivity and DDV.

TABLE 11

| Devulcanizing agent | Volume of xylene (ml) | Time (hours) | Temperature (° C.) | DDV | DOF |
| --- | --- | --- | --- | --- | --- |
| 1a | 25 | 4 | 80 | 31.5% | 7% |
| 1b | 25 | 4 | 80 | 57.9% | 27% |
| 1c | 25 | 4 | 80 | 50.2% | 27% |
| 1d | 25 | 4 | 80 | 60.4% | 2% |

According to this embodiment, other derivatives of benzoyl peroxide (BPO) were used as DAs. These compounds are designated 1e, 1f, 1g and 1 h. Compound 1e comprises two methyl groups (—CH$_3$) as substituent R and R' which exert an effect of the donor inductive type on the aromatic ring to which they are bound. Compound if comprises two nitro groups (—NO$_2$) as substituent R and R' which exert an effect of the attractor mesomeric type on the aromatic ring to which they are bound. Compound 1g comprises two chlorine atoms in the ortho position as substituent R and R' which exert an effect of the attractor inductive type on the aromatic ring to which they are bound. Compound 1h comprises two bromine atoms as substituent R and R' which exert an effect of the attractor inductive type on the aromatic ring to which they are bound.

The method was carried out under air starting from granules from scrap lorry tyres that had not undergone activation. The effect of the various substituents R and R' is shown in Table 12. All the derivatives of BPO presented produce a clear improvement of the DDV. Compounds 1e, 1g and 1 h produce an improvement of the DDV greater than a factor of two. Compound if also produces a notable increase in the DOF, but it remains less than 30%. Compounds if and 1 h also produce a decrease in the DOF of 6% and 3% respectively and consequently make the method highly selective. Once again, whether the electron density of the aromatic ring is increased by the effect of the substituents exerting a donor effect or whether its electron density is depleted by the effect of the substituents exerting an attractor effect, the DDV remains markedly increased with the substituted derivatives of BPO comprising donor or attractor substituents R and R'.

Regarding compound 1g, it is to be noted that to obtain DDV levels equivalent to the other compounds presented (1b, 1c, 1d, 1e, 1f and 1 h), a reaction time of three hours was selected. A reaction time of 4 h leads to a DDV equivalent to that obtained with compound 1a and to a substantial increase in the DOF.

These results confirm the possibility of envisaging the synthesis of a great variety of functionalized oligomers. The results obtained when compounds 1f and 1 h are used when carrying out the method are particularly interesting in terms of selectivity and DDV. The results obtained when compounds 1e and 1 h are used when carrying out the method are particularly interesting in terms of DDV. Compounds 1d and 1 h seem quite particularly interesting in view of the high DDV that they make it possible to obtain and the low DOF (selective reaction, i.e. little depolymerization).

TABLE 12

| Devulcanizing agent | Volume of xylene (ml) | Time (hours) | Temperature (° C.) | DDV | DOF |
|---|---|---|---|---|---|
| 1e | 25 | 4 | 80 | 65.2% | 12% |
| 1f | 25 | 4 | 80 | 52.1% | 6% |
| 1g | 25 | 3 | 80 | 60.6% | 14.8% |
| 1h | 25 | 4 | 80 | 62.2% | 3% |

According to a third embodiment, the solvent used when carrying out the method is trihexyltetradecylphosphonium chloride, an ionic liquid marketed under the name "Cyphos 101", the DA used is benzoyl peroxide of formula 1a, and the method is carried out under air or under an inert atmosphere. The use of an ionic liquid as solvent gives rise automatically to swelling of the waste, concomitantly with devulcanization. This makes it possible to increase the DDV, as discussed above. Furthermore, the use of an ionic liquid as solvent actually gives rise to precipitation of the synthesized functionalized oligomers. Accordingly, the method can be carried out continuously and no longer requires an extraction step subsequent to the carrying out of devulcanization.

According to the third embodiment, additional experiments were carried out to illustrate the effect of the solvent. The DDV and the DOF were measured after the method was carried out in a eutectic solvent, choline chloride/urea, designated 2a, and in ionic liquids, respectively in "Cyphos 101", designated 2b, and in dioctylimidazolium bromide ([DOIM][BR]), designated 2c. The method was carried out under air starting from granules from scrap lorry tyres that had not undergone prior activation. BPO was used as DA. The results are reported in Table 13.

In the case of "Cyphos 101", the extraction of the products of the devulcanization reaction was not sufficient for determining the DOF. On comparing these results with those obtained with compound 1a (BPO) in Table 11, it can be seen that the DDV is increased considerably when ionic liquids or eutectic solvents are used. Conversely, a slight increase in the DOF is observed when a eutectic solvent is used and a sizeable increase when an ionic liquid is used.

TABLE 13

| Solvent | Volume of solvent (ml) | Time (hours) | Temperature (° C.) | DDV | DOF |
|---|---|---|---|---|---|
| 2a | 25 | 4 | 80 | 54.2% | 10% |
| 2b | 25 | 4 | 80 | 45.6% | — |
| 2c | 25 | 4 | 80 | 53.7% | 21% |

The results presented above demonstrate that the method for synthesizing polymers by devulcanization according to the invention makes it possible, among other things, to obtain functionalized polymers that may contain a large number of different substituents, degrees of depolymerization lower than those obtained by the methods usually used and degrees of devulcanization higher than those obtained by the methods usually used.

The invention claimed is:
1. A method for synthesizing polymers by devulcanization from waste containing elastomers, said method comprising:
a) contacting said waste containing elastomers with a solvent in the presence of an agent for devulcanization of cross-linking points that comprise a sulphur atom bound to another sulphur atom or to a carbon atom;
b) heating the mixture obtained in step a) at a temperature comprised between 20° C. and 250° C. for a time comprised between 15 minutes and 24 hours; and said method including:
the devulcanizing agent is a compound according to formula (1)

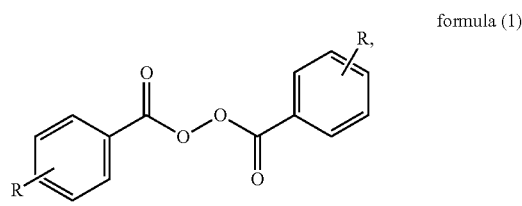

formula (1)

in which R and R' are identical or different and each represent, independently of one another, a substituent exerting a donor mesomeric effect or an attractor mesomeric effect or a donor inductive effect or an attractor inductive effect, R and R' are selected independently of one another from the group comprising hydrogen (—H), the halogen atoms selected from iodine, bromine, fluorine and chlorine, the group of $(C_{1-18})$alkyls, primary amines (—$NH_2$), secondary amines (—$NHRa_1$, $Ra_1$ being selected from $(C_1-C_5)$alkyl groups and aromatic rings) or tertiary amines (—$NRa_1Ra_2$, where $Ra_1$ and $Ra_2$, which are identical or different, may each independently of one another be a $(C_1-C_5)$alkyl group or an aromatic ring), hydroxyl (—OH), the alcoholates (or a salt) ($Ra_1$—$O^-$, $Ra_1$ being selected from $(C_1-C_5)$alkyl groups and aromatic rings), the $(C_1-C_5)$alkoxy groups, a thiol (—SH), the thioethers (—$SRa_1$, $Ra_1$ being selected from $(C_1-C_5)$alkyl groups and aromatic rings), a thiolate (or a salt) ($Ra_1$—$S^-$), $Ra_1$ being selected from $(C_1-C_5)$alkyl groups and aromatic rings), an aromatic ring, a conjugated base of a carboxylic acid (—$COO^-$), a carboxyl group (—COOH), the esters (—$CO_2 Ra_1$, $Ra_1$ being selected from $(C_1-C_5)$alkyl groups and heterocycles), an aldehyde group (—CHO), a carbonyl (—COR), a nitro group (—$NO_2$), a nitrile group (—CN), a sulphonyl group (—$SO_2$—), a sulphonate group (salt or acid)(—$SO_3$), a sulphone (—$SO_2R$), a phosphate group —O—$PO(ORa_1)(ORa_2)$ where $Ra_1$ and $Ra_2$, which are identical or different, may each independently of one another be a hydrogen or $(C_1-C_5)$alkyl group or an aromatic ring), a primary amide group (—$CONH_2$), secondary amide group (—$CONHRa_1$, $Ra_1$ being selected from $(C_1-C_5)$alkyl groups and aromatic rings) or tertiary amide group (—$CONRa_1Ra_2$, $Ra_1$ and $Ra_2$, which are identical or different, may each independently of one another be a $(C_1-C_5)$alkyl group or an aromatic ring)) and R, R' or both are different from a hydrogen atom and wherein said synthesized polymers are functionalized elastomer according to formula 3 or 3',

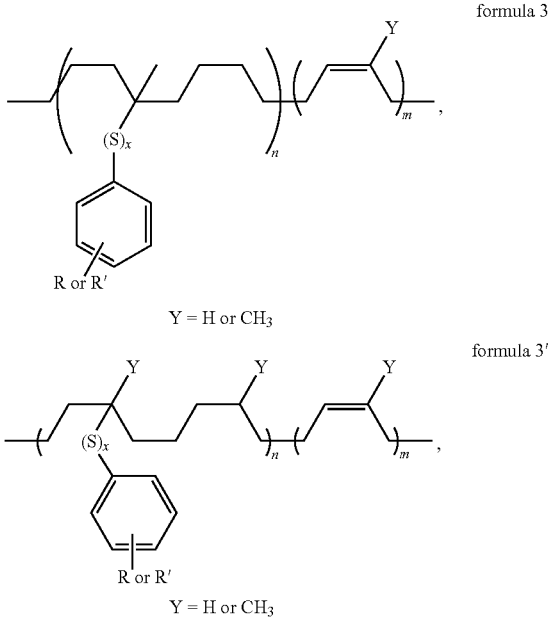

Y = H or CH₃

Y = H or CH₃ in which x is an integer comprised between 0 and 6, n is an integer comprised between 6 and 600, m is an integer comprised between 6 and 600, Y is a hydrogen atom or a methyl group, and R and R', which are identical or different for each unit, are selected from the group comprising halogen atoms selected from iodine, bromine, fluorine and chlorine, the group of ($C_{1-18}$) alkyls, the primary amines (—$NH_2$), secondary amines (—$NHRa_1$, $Ra_1$ being selected from ($C_1$-$C_5$) alkyl groups and aromatic rings) or tertiary amines (—$NRa_1Ra_2$, where $Ra_1$ and $Ra_2$, which are identical or different, may each independently of one another be a ($C_1$-$C_5$) alkyl group or an aromatic ring), hydroxyl (—OH), the alcoholates (or a salt) ($Ra_1$—O—, $Ra_1$ being selected from ($C_1$-$C_5$) alkyl groups and aromatic rings), the ($C_1$-$C_5$) alkoxy groups, a thiol (—SH), the thioethers (—$SRa_1$, $Ra_1$ being selected from ($C_1$-$C_5$) alkyl groups and aromatic rings), a thiolate (or a salt)($Ra_1$ —S—, Raj being selected from ($C_1$-$C_5$) alkyl groups and aromatic rings), an aromatic ring, a conjugated base of a carboxylic acid (—COO—), a carboxyl group (—COOH), the esters (—$CO_2$ $Ra_1$, $Ra_1$ being selected from ($C_1$-$C_5$) alkyl groups and heterocycles), an aldehyde group (—CHO), a carbonyl (—COR), a nitro group (—$NO_2$), a nitrile group (—CN), a sulphonyl group (—$SO_2$—), a sulphonate group (salt or acid)(—$SO_3$), a sulphone (—$SO_2R$), a phosphate group —O—PO ($ORa_1$) ($ORa_2$) where $Ra_1$ and $Ra_2$, which are identical or different, may each independently of one another be a hydrogen or ($C_1$-$C_5$) alkyl group or an aromatic ring), a primary amide group (—$CONH_2$), secondary amide group (—$CONHRa_1$, Raj being selected from ($C_1$-$C_5$) alkyl groups and aromatic rings) or tertiary amide group (—$CONRa_1Ra_2$, $Ra_1$ and $Ra_2$, which are identical or different, may each independently of one another be a ($C_1$-$C_5$) alkyl group or an aromatic ring).

2. The method according to claim 1, in which the concentration of devulcanizing agent is such that the ratio of said concentration of devulcanizing agent, expressed in parts per hundred of elastomer (phr), to the volume of solvent, expressed in ml, is:

greater than 0.3 phr/ml of solvent or less than 0.2 phr/ml of solvent when the method is carried out under air, greater than 0.06 phr/ml of solvent when the method is carried out under an inert atmosphere.

3. The method according to claim 1, in which the solvent is an organic solvent or an ionic liquid or a deep eutectic solvent or a mixture thereof.

4. The method according to claim 1, characterized in that the heating time of the mixture is comprised between 2 hours and 4 hours when the method is carried out under an inert atmosphere.

5. The method according to claim 1, in which the heating time of the mixture is comprised between 3 hours and 5 hours when the method is carried out under air.

6. The method according to claim 1, characterized in that it comprises, prior to step a), a step of activation of the waste containing elastomers by lyophilization or by swelling.

7. The method according to claim 6, in which the devulcanization reaction and the step of activation of the waste containing elastomers are carried out continuously.

8. The method according to claim 1, characterized in that the synthesis of the polymers by devulcanization is carried out starting from waste of highly vulcanized elastomers.

9. A functionalized elastomer according to formula 3 or 3',

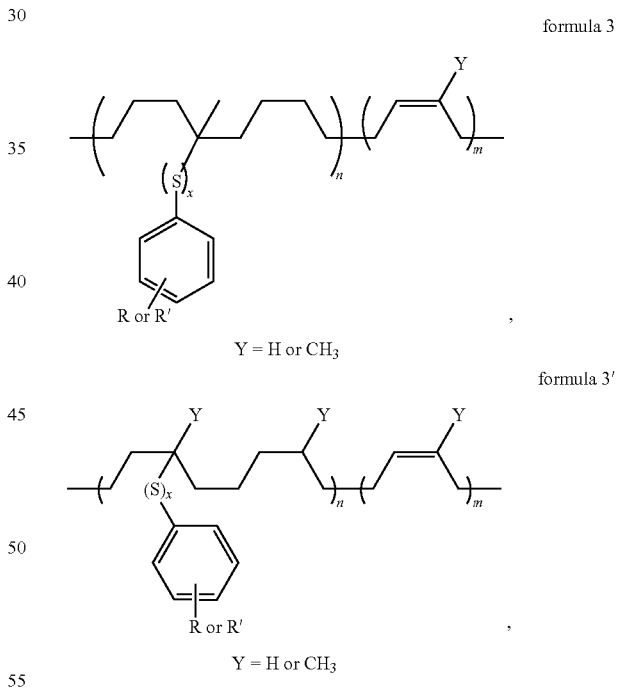

Y = H or CH₃

Y = H or CH₃ in which x is an integer comprised between 0 and 6, n is an integer comprised between 6 and 600, m is an integer comprised between 6 and 600, Y is a hydrogen atom or a methyl group, and R and R', which are identical or different for each unit, are selected from the group comprising halogen atoms selected from iodine, bromine, fluorine and chlorine, the group of ($C_{1-18}$)alkyls, the primary amines (—$NH_2$), secondary amines (—$NHRa_1$, $Ra_1$ being selected from ($C_1$-$C_5$)alkyl groups and aromatic rings) or tertiary amines (—$NRa_1Ra_2$, where $Ra_1$ and $Ra_2$, which are identical or different, may each independently of one another be a $(C_1-C_5)$alkyl group or an aromatic ring), hydroxyl (—OH), the alcoholates (or a salt) ($Ra_1$—$O^-$, $Ra_1$ being selected from $(C_1-C_5)$alkyl groups and aromatic rings), the $(C_1-C_5)$alkoxy groups, a thiol (—SH), the thioethers (—$SRa_1$, $Ra_1$ being selected from $(C_1-C_5)$alkyl groups and aromatic rings), a thiolate (or a salt) ($Ra_1$—$S^-$, $Ra_1$ being selected from $(C_1-C_5)$alkyl groups and aromatic rings), an aromatic ring, a conjugated base of a carboxylic acid (—$COO^-$), a carboxyl group (—COOH), the esters (—$CO_2$ $Ra_1$, $Ra_1$ being selected from $(C_1-C_5)$alkyl groups and heterocycles), an aldehyde group (—CHO), a carbonyl (—COR), a nitro group (—$NO_2$), a nitrile group (—CN), a sulphonyl group (—$SO_2$—), a sulphonate group (salt or acid)(—$SO_3$), a sulphone (—$SO_2R$), a phosphate group —O—PO($ORa_1$)($ORa_2$) where $Ra_1$ and $Ra_2$, which are identical or different, may each independently of one another be a hydrogen or $(C_1-C_5)$alkyl group or an aromatic ring), a primary amide group (—$CONH_2$), secondary amide group (—$CONHRa_1$, $Ra_1$ being selected from $(C_1-C_5)$alkyl groups and aromatic rings) or tertiary amide group (—$CONRa_1Ra_2$, $Ra_1$ and $Ra_2$, which are identical or different, may each independently of one another be a $(C_1-C_5)$alkyl group or an aromatic ring).

10. A polymer composition obtained by the method according to claim 1.

* * * * *